Feb. 21, 1928.
M. LEHTONEN
CORD AND ROPE HOLDER
Filed April 21, 1927
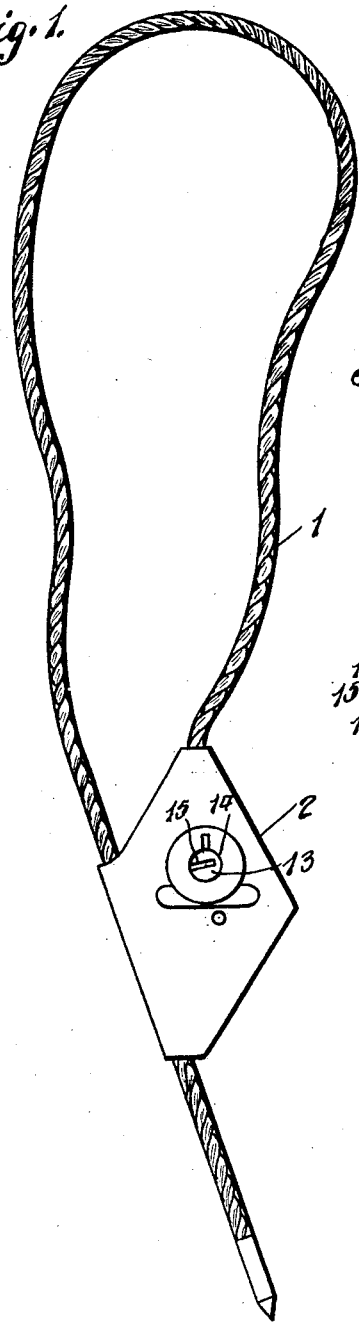
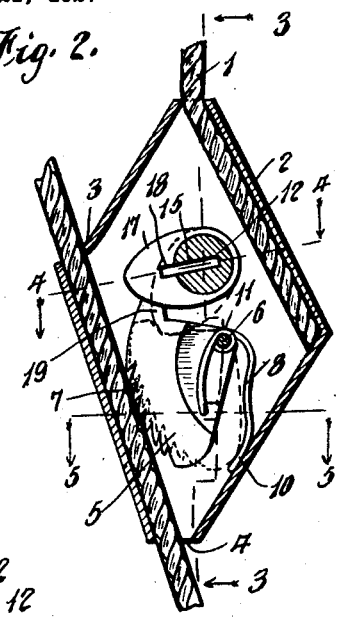
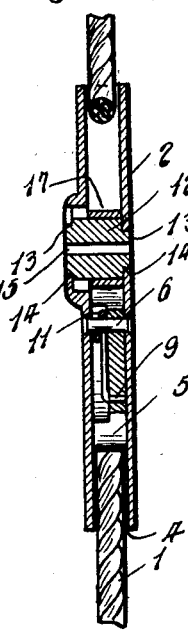
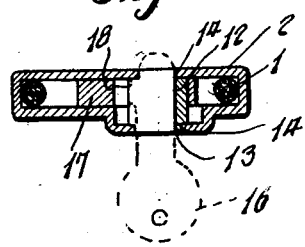
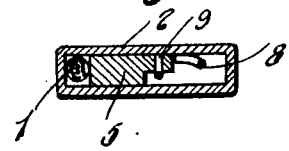
Inventor
M. Lehtonen,
By
Attorney Patented Feb. 21, 1928.

1,660,040

UNITED STATES PATENT OFFICE.

MATTI LEHTONEN, OF CHISHOLM, MINNESOTA.

CORD AND ROPE HOLDER.

Application filed April 21, 1927. Serial No. 185,530.

The invention relates to means for holding the loose ends of a cord or rope or like flexible member, and has for its principal object the provision of means for securely holding the free end of a rope to admit of tightening the loop formed thereby but to prevent enlargement of the loop.

A further object of the invention is a lock controlled means for holding the loose ends of a flexible member, the holding means comprising a spring actuated pivoted dog to normally lock the flexible member to prevent enlargement of a loop formed therewith, the dog being movable from engaging position by means of a key controlled member.

The invention will be described in detail hereinafter and will be found illustrated in the accompanying drawings, in which Figure 1 is a plan view of the improved cord and rope holder, Figure 2 is a horizontal sectional view through the holding casing, and Figures 3, 4, and 5, are sectional details on planes indicated by the lines 3—3, 4—4, and 5—5, respectively.

In the drawings similar reference characters will be used to designate corresponding parts throughout the several views.

A flexible member 1 which may be made of any suitable material, such for instance as metal or fiber, has one of its ends secured in casing 2. The loose end of the flexible member 1 is slipped through the casing 2, openings 3 and 4 being provided for this purpose.

A dog 5 is pivotally mounted on pivot pin 6 secured in the side walls of the casing 2 and is provided with a serrated edge 7 to engage the loose end of the flexible member 1, and is held in engaging position by means of a spring 8 having one of its ends 9 bent at a right angle and engaging in an opening in the dog 5 and its other end 10 engaging a wall of the casing, the spring being formed with a coil intermediate of its ends, designated 11 and enclosing the pin 6. Cylinder 12 is rotatably mounted in the casing 1 having its ends formed with reduced portions 13 engaging in openings 14 in the walls of the casing and is provided with a keyway 15 to receive the stem of a key 16. 17 designates a cam member rotatably mounted on the cylinder 12 and having a notch 18 to aline with the keyway 15 for the reception of a ward on the stem of the key 16 to provide for actuation of the cam member to move it into engagement with the dog 5 to actuate the dog out of engagement with the flexible member 1, the dog 5 being provided with a shoulder 19 that is engageable by the cam 17 to hold the dog in disengaged position as indicated by broken lines in Figure 2.

It will be understood that the device is adapted for use in connection with flexible members of any material, such for instance as wire or wire rope, fibrous cords or ropes, chains, straps of leather or other material, and is adapted for use as a package tie as well as for securing luggage, sacks, pouches, spare tires of automobiles and for snares for snaring game, it being understood that when the loose end of the flexible member 1 is engaged by the dog 5 the loop formed by the flexible member may be restricted, but cannot be enlarged until the dog 5 is released from engagement with the loose end of the flexible member by operation of the key controlled cam 17.

What is claimed is:—

1. A cord and rope holder, comprising a casing, a flexible member having one end fixedly secured in the casing, the loose end of said flexible member adapted to slip through the casing, a spring actuated dog adapted to engage said loose end of the flexible member and hold it engaged in the casing, a key actuated cylinder having a keyway therein, and a cam member rotatably mounted on said cylinder and having a notch therein adapted to aline with the keyway for reception of a key, said cam being adapted to be actuated to move the dog from engaging the flexible member.

2. A cord and rope holder, comprising a casing, a flexible member having one end fixedly secured in the casing, the loose end of said flexible member adapted to slip through the casing, a dog pivotally engaged in said casing and adapted to engage said loose end of the flexible member to hold it from slipping in one direction, a spring engaging said dog to hold it in engaging position, a key actuated cylinder, a cam member rotatably mounted on the cylinder, said cylinder and cam member having keyways therein, and the cam member adapted to engage the dog and hold it from engagement with the flexible member.

3. A cord and rope holder, comprising a casing, a flexible member having one end fixedly secured in the casing, the loose end of said flexible member adapted to slip through the casing, a dog pivotally engaged in said casing and adapted to engage said loose end of the flexible member to hold it from slipping in one direction, a spring engaging said dog to hold it in engaging position, a key actuated cylinder, a cam member rotatably mounted on the cylinder, said cylinder and cam member having keyways therein, the cam member adapted to engage the dog and move it from engagement with the flexible member, and a shoulder on the dog engageable by the cam member when in disengaged position.

In testimony whereof I affix my signature.

MATTI LEHTONEN.